US006981280B2

(12) United States Patent
Grupe

(10) Patent No.: US 6,981,280 B2
(45) Date of Patent: Dec. 27, 2005

(54) INTELLIGENT NETWORK SCANNING SYSTEM AND METHOD

(75) Inventor: Robert R. Grupe, Tring (GB)

(73) Assignee: McAfee, Inc., Santa Clara, CA (US)

( * ) Notice: Subject to any disclaimer, the term of this patent is extended or adjusted under 35 U.S.C. 154(b) by 1008 days.

(21) Appl. No.: 09/895,499

(22) Filed: Jun. 29, 2001

(65) Prior Publication Data

US 2003/0009690 A1    Jan. 9, 2003

(51) Int. Cl.[7] .............................................. G06F 11/30
(52) U.S. Cl. ......................... 726/22; 726/11; 726/12; 726/13; 726/23; 726/24; 713/187; 713/188
(58) Field of Search .................... 713/153, 179, 713/187, 200, 201, 188; 709/203, 205, 223, 709/224; 726/11, 12, 13, 14, 22, 23, 24

(56) References Cited

U.S. PATENT DOCUMENTS

| | | | |
|---|---|---|---|
| 5,319,776 A | 6/1994 | Hile et al. ................... | 395/575 |
| 5,491,791 A | 2/1996 | Glowny et al. ........ | 395/183.13 |
| 5,623,600 A | 4/1997 | Ji et al. ................. | 395/187.01 |
| 5,832,208 A | 11/1998 | Chen et al. ............ | 395/187.01 |
| 5,889,943 A | 3/1999 | Ji et al. ................. | 395/187.01 |
| 6,014,558 A | 1/2000 | Thomas ....................... | 455/410 |
| 6,088,803 A | 7/2000 | Tso et al. ................... | 713/201 |
| 6,092,194 A | 7/2000 | Touboul ..................... | 713/200 |
| 6,381,641 B1 | 4/2002 | Iwasaki ...................... | 709/224 |
| 6,397,335 B1 | 5/2002 | Franczek et al. ........... | 713/200 |
| 6,802,012 B1 * | 10/2004 | Smithson et al. ........... | 713/200 |
| 2001/0005889 A1 * | 6/2001 | Albrecht ..................... | 713/201 |

FOREIGN PATENT DOCUMENTS

WO         93/22723 A1    11/1993   ........... G06F 11/00

OTHER PUBLICATIONS

PR Newswire, "F-Secure's Anti-Virus for Firewalls and Anti-Virus for Internet Mail Is Supported by Stonebeat® Securitycluster™ from Stonesoft," Jan. 16, 2001, PR Newswire Assoc., Inc., p. 00494847.*
Stonesoft, "StoneBeat SecurityCluster White Paper," Aug. 2000.*
Stonesoft Corporation, "StoneBeat SecurityCluster™ Manual," 2001, Version 2.0.*

* cited by examiner

Primary Examiner—Justin T. Darrow
(74) Attorney, Agent, or Firm—Zilka-Kotab, PC; Christopher J. Hamaty

(57) ABSTRACT

A system, method and computer program product are provided for scanning data. Initially, data is received at a network element. Thereafter, a load on the network element is identified. The data is then conditionally scanned at the network element based on the load on the network element. Another system, method and computer program product are provided for scanning data. After the receipt of data at a network element, it is determined as to whether there is a request for the data. The data may then be conditionally scanned at the network element based on whether there is a request for the data. The data is subsequently transmitted in response to the request. Still another system, method and computer program product are provided for scanning data. Upon the receipt of data at a network element, an extent to which the data was previously scanned by another network element is determined. The data is then conditionally scanned at the network element based on the extent to which the data was previously scanned by another network element.

29 Claims, 6 Drawing Sheets

INTELLIGENT NETWORK SCANNING SYSTEM AND METHOD

FIELD OF THE INVENTION

The present invention relates to scanning methods, and more particularly to intelligent scanning methods.

BACKGROUND OF THE INVENTION

Network security management is becoming a more difficult problem as networks grow in size and become a more integral part of organizational operations. Attacks on networks are growing both due to the intellectual challenge such attacks represent for hackers and due to the increasing payoff for the serious attacker. Furthermore, the attacks are growing beyond the current capability of security management tools to identify and quickly respond to those attacks. As various attack methods are tried and ultimately repulsed, the attackers will attempt new approaches with more subtle attack features. Thus, maintaining network security is an on-going, ever changing, and increasingly complex problem.

Computer network attacks can take many forms and any one attack may include many security events of different types. Security events are anomalous network conditions each of which may cause an anti-security effect to a computer network. Security events include stealing confidential or private information; producing network damage through mechanisms such as viruses, worms, or Trojan horses; overwhelming the network's capability in order to cause denial of service, and so forth.

Security systems often employ security risk-assessment tools, i.e. "scanners," to simulate an attack against computer systems via a remote connection. Such scanners can probe for network weaknesses by simulating certain types of security events that make up an attack. Such tools can also test user passwords for suitability and security. Moreover, scanners can search for known types of security events in the form of malicious programs such as viruses, worms, and Trojan horses. Further, scanners are used for content filtering to enforce an organization's operational policies [i.e. detecting harassing or pornographic content, junk e-mails, misinformation (virus hoaxes), etc.].

In most security systems, data often gets scanned multiple times as it is transmitted through various network elements. For data entering from external networks, there is usually some security scanning that first takes place at a network gateway. Then, the data is scanned again when it is saved to a server after which it is scanned once again by an end user workstation upon retrieval. This redundant scanning results in unnecessary, duplication of computing workload resources. Organizations must purchase equipment that can handle all such additional information processing in the form of more memory and additional processing capacity. There is thus a need for reducing the redundancy of scanning in security system scanning, and avoiding the need for additional resources.

Security systems often use gateway scanning to analyze data entering a network from other uncontrolled networks to detect possible attacks. Of course, this requires time and resources at the gateway. As such, gateway scanning often involves a balance between providing timely access to the data stream by an end user, and providing a thorough scan of the incoming data. So long as there is not much data passing through the gateway, comprehensive scanning can be accomplished without interrupting timely user access to the data. However, if the gateway is extremely busy checking for many different potential threats, the data access may be unacceptably constricted. There is thus a need for optimally balancing timely access to the data stream by an end user, and providing a thorough scan of the incoming data in a gateway environment.

Current security systems employ an "all or nothing" approach to scanning. When triggered either by an access or scheduled request, a specified scan must be executed completely (100%) irregardless of current computing resource availability. Some e-mail server scanning programs feature "trusted scanning."Once an item has been scanned by one server, it may be flagged so subsequent e-mail servers can avoid re-scanning the item. Unfortunately, such e-mail server scanning programs require complete scans if one is required at all. There is thus a need for improving load balancing by exploiting partial scans as opposed to the complete scans of the prior art.

DISCLOSURE OF THE INVENTION

A system, method and computer program product are provided for scanning data. Initially, data is received at a network element. Thereafter, a load on the network element is identified. The data is then conditionally scanned at the network element based on the load on the network element.

In one aspect of the present embodiment, the network element may include a gateway. Further, the load may include a backlog of data to be scanned at the network element.

In another aspect of the present embodiment, an amount of scanning completed at the network element may be a function of the load on the network element. In particular, the data may be partially scanned at the network element if the load on the network element is greater than a predetermined amount. If, however, the load on the network element is less than the predetermined amount, the data may be completely scanned at the network element.

As an option, a status of the scanning at the network element may be stored in memory. As such, an additional network element, i.e. a server, may conditionally scan the data based on the status.

Another system, method and computer program product are provided for scanning data. After the receipt of data at a network element, it is determined as to whether there is a request for the data. The data may then be conditionally scanned at the network element based on whether there is a request for the data. The data is subsequently transmitted in response to the request.

In one aspect of the present embodiment, the network element may include a server. Further, the request for the data may be received from a user device.

In another aspect of the present embodiment, the data may be partially scanned at the network element if it is determined that there is a request for the data. If it is determined that there is not a request for the data, the data may be completely scanned at the network element.

Still another system, method and computer program product are provided for scanning data. Upon the receipt of data at a network element, an extent to which the data was previously scanned by another network element is determined. The data is then conditionally scanned at the network element based on the extent to which the data was previously scanned by another network element.

In one aspect of the present embodiment, the network element may include a user device. Further, an amount of scanning completed at the network element may be a function of the extent to which the data was previously scanned by another network element. In particular, an amount of scanning completed at the network element may be sufficient to complete an entirety of the scanning.

Optionally, the extent to which the data was previously scanned by another network element is identified in a log accessible by the network element.

DESCRIPTION OF THE PREFERRED EMBODIMENTS

Figure 1:
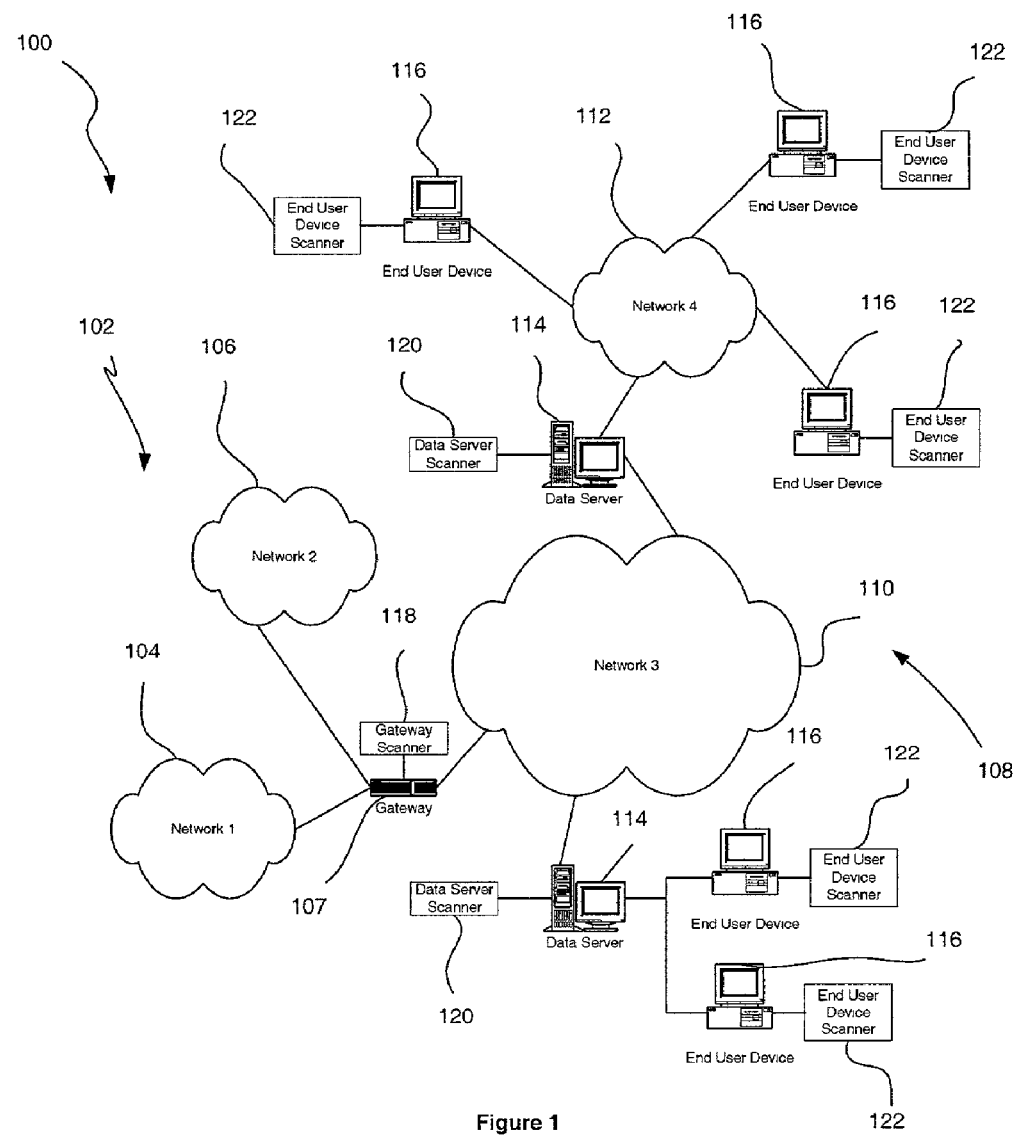
FIG. 1 illustrates a network architecture, in accordance with one embodiment.

FIG. 1 illustrates a network architecture 100, in accordance with one embodiment. As shown, a plurality of remote networks 102 are provided including a first remote network 104 and a second remote network 106. Also included is at least one gateway 107 coupled between the remote networks 102 and a plurality of proximate networks 108. Such proximate networks 108 include a first proximate network 110 and a second proximate network 112. In the context of the present network architecture 100, the networks 104, 106, 110 and 112 may each take any form including, but not limited to a local area network (LAN), a wide area network (WAN) such as the Internet, etc.

In use, the gateway 107 serves as an entrance point from the remote networks 102 to the proximate networks 108. As such, the gateway 107 may function as a router, which is capable of directing a given packet of data that arrives at the gateway 107, and a switch, which furnishes the actual path in and out of the gateway 107 for a given packet.

Further included is at least one data server 114 coupled to the proximate networks 108, and which are accessible from the remote networks 102 via the gateway 107. It should be noted that the data servers 114 may include any type of computing device/groupware. Coupled to the data servers 114 is a plurality of user devices 116. Such user devices 116 may include a desktop computer, lap-top computer, handheld computer, printer or any other type of logic. It should be noted that the user devices 116 may also be directly coupled to the networks, in one embodiment.

Further provided is a plurality of scanners coupled to the various network elements of the network architecture 100. In particular, a gateway scanner 118 is coupled to each gateway 107, a data server scanner 120 is coupled to each data server 114, and an user device scanner 122 is coupled to each user device 116. It should be noted that additional scanners may be utilized with any type of network element coupled to the networks 104, 106, 110 and 112. In the context of the present description, a network element may refer to any component of a network. In use, each of the scanners is capable of executing a scanning procedure. Details regarding such scanning procedure will be set forth hereinafter in greater detail.

Figure 2:
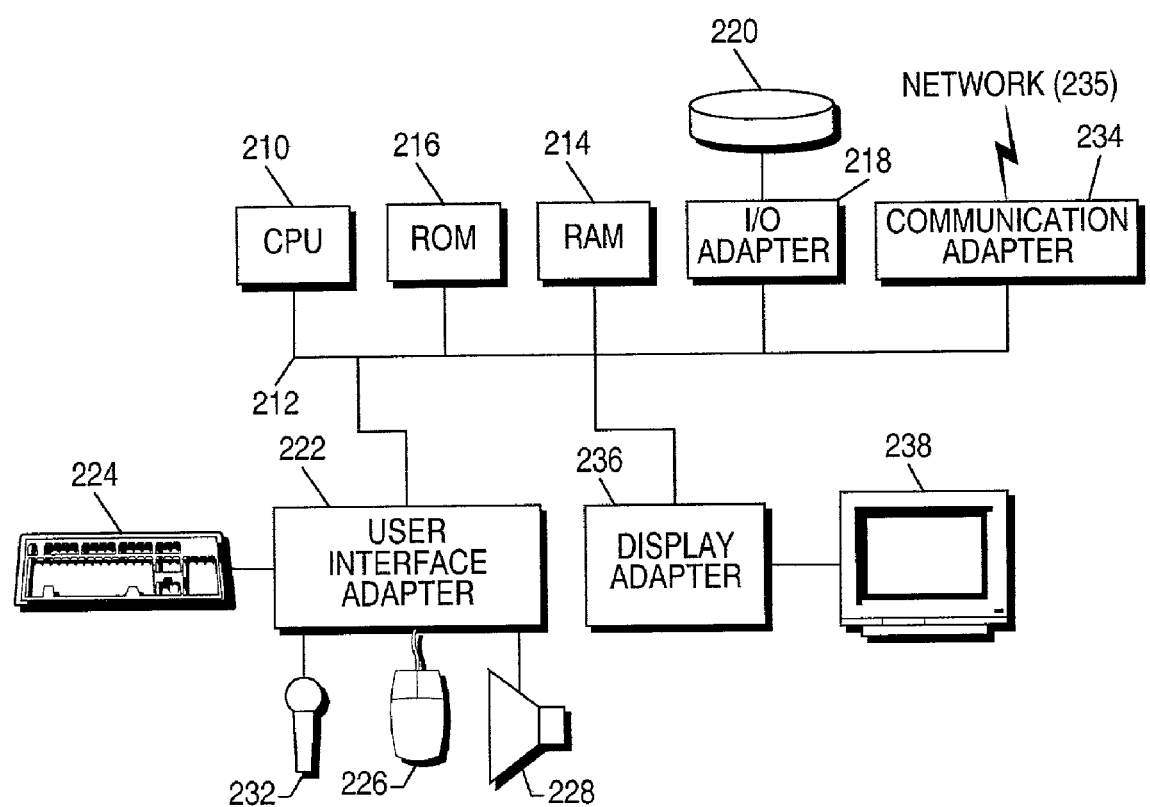
FIG. 2 shows a representative hardware environment that may be associated with the data servers and user devices of FIG. 1, in accordance with one embodiment.

FIG. 2 shows a representative hardware environment that may be associated with the data servers 114 and user devices 116 of FIG. 1, in accordance with one embodiment. Such figure illustrates a typical hardware configuration of a workstation in accordance with a preferred embodiment having a central processing unit 210, such as a microprocessor, and a number of other units interconnected via a system bus 212.

The workstation shown in FIG. 2 includes a Random Access Memory (RAM) 214, Read Only Memory (ROM) 216, an I/O adapter 218 for connecting peripheral devices such as disk storage units 220 to the bus 212, a user interface adapter 222 for connecting a keyboard 224, a mouse 226, a speaker 228, a microphone 232, and/or other user interface devices such as a touch screen and a digital camera (not shown) to the bus 212, communication adapter 234 for connecting the workstation to a communication network 235 (e.g., a data processing network) and a display adapter 236 for connecting the bus 212 to a display device 238.

The workstation may have resident thereon an operating system such as the MICROSOFT WINDOWS NT or WINDOWS/95 Operating System (OS), the IBM OS/2 operating system, the MAC OS, or UNIX operating system. It will be appreciated that a preferred embodiment may also be implemented on platforms and operating systems other than those mentioned. A preferred embodiment may be written using JAVA, C, and/or C++ language, or other programming languages, along with an object oriented programming methodology. Object oriented programming (OOP) has become increasingly used to develop complex applications.

Figure 3:
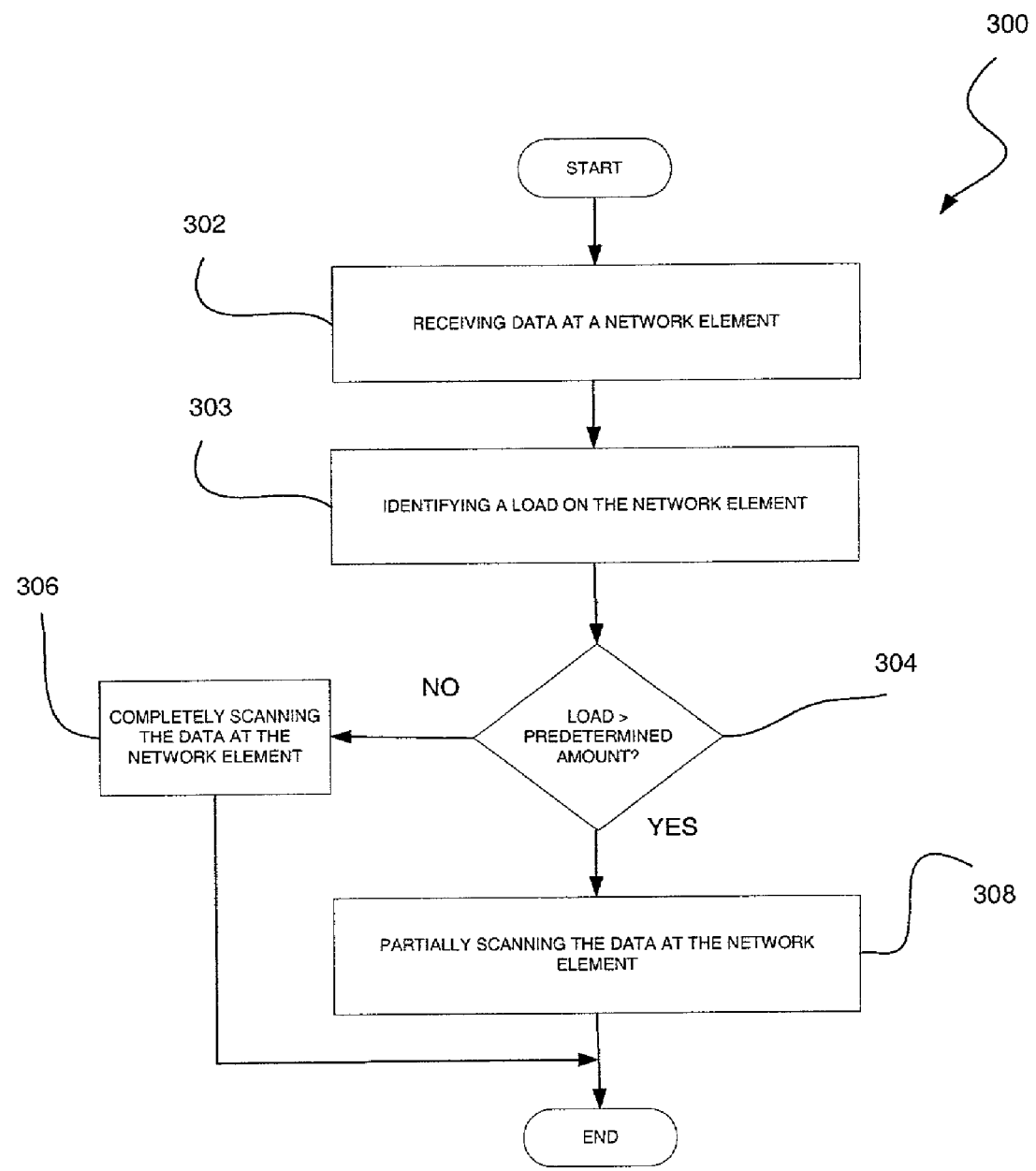
FIG. 3 illustrates a method for scanning data, in accordance with one embodiment.

FIG. 3 illustrates a method 300 for scanning data, in accordance with one embodiment. Optionally, the method 300 may be executed by the gateway scanner 118 coupled to the gateway 107 of FIG. 1. It should be noted, however, that the method 300 may be executed by any of the scanners 118, 120 and/or 122 of FIG. 1, or by a scanner associated with any desired network element.

Initially, in operation 302, data is received at the network element. Thereafter, a load on the network element is identified. Note operation 303. As an option, the load may include a backlog of data to be scanned at the network element. Such backlog may be identified by determining an amount, i.e. MB, of data to be scanned. As an option, the amount may refer to a data flow rate. In the alternative, the load may be caused by general network traffic, resource shortages, bandwidth restrictions, etc.

Thereafter, in decision 304, it is determined whether the load meets predetermined criteria. In one embodiment, it may be determined whether the load is greater than a predetermined amount. Such predetermined amount may be selected to ensure optimal operation of the network element.

If the load is less than the predetermined amount, the data may be completely scanned in its entirety at the network element. See operation 306. On the other hand, the data may only be partially scanned, or not scanned at all, at the network element if the load is greater than the predetermined amount. Note operation 308. As an option, an amount of scanning completed at the network element may be a function of the load on the network element.

Of course, the data may be conditionally scanned at the network element based on the load on the network element in any desired manner. It should be noted that the partial and complete scans may each include any type of scan and differ in any desired manner as long as the partial scan takes less time to execute with respect to the complete scan.

For example, scans often take the form of multiple scanning modules each adapted to detect different types of vulnerabilities, banned content, viruses, etc. A partial scan may simply be a subset of the full collection of such scanning modules. Moreover, the selection of the subset may be specifically tailored to the particular network element, environment, etc. and the specific vulnerabilities thereof. In the context of the present description, a partial scan may also refer to a complete scan of only a portion of the data queued to be scanned.

As an option, a status of the scanning at the network element may be stored in memory. As such, an additional network element, i.e. a server, may conditionally scan the data based on the status in a manner that will be set forth in greater detail during reference to FIG. 6. It should be noted that such memory may take the form of a database, centralized reference information repository, an indexed flat file, a holographic storage system, or any memory capable of storing information.

Figure 4:
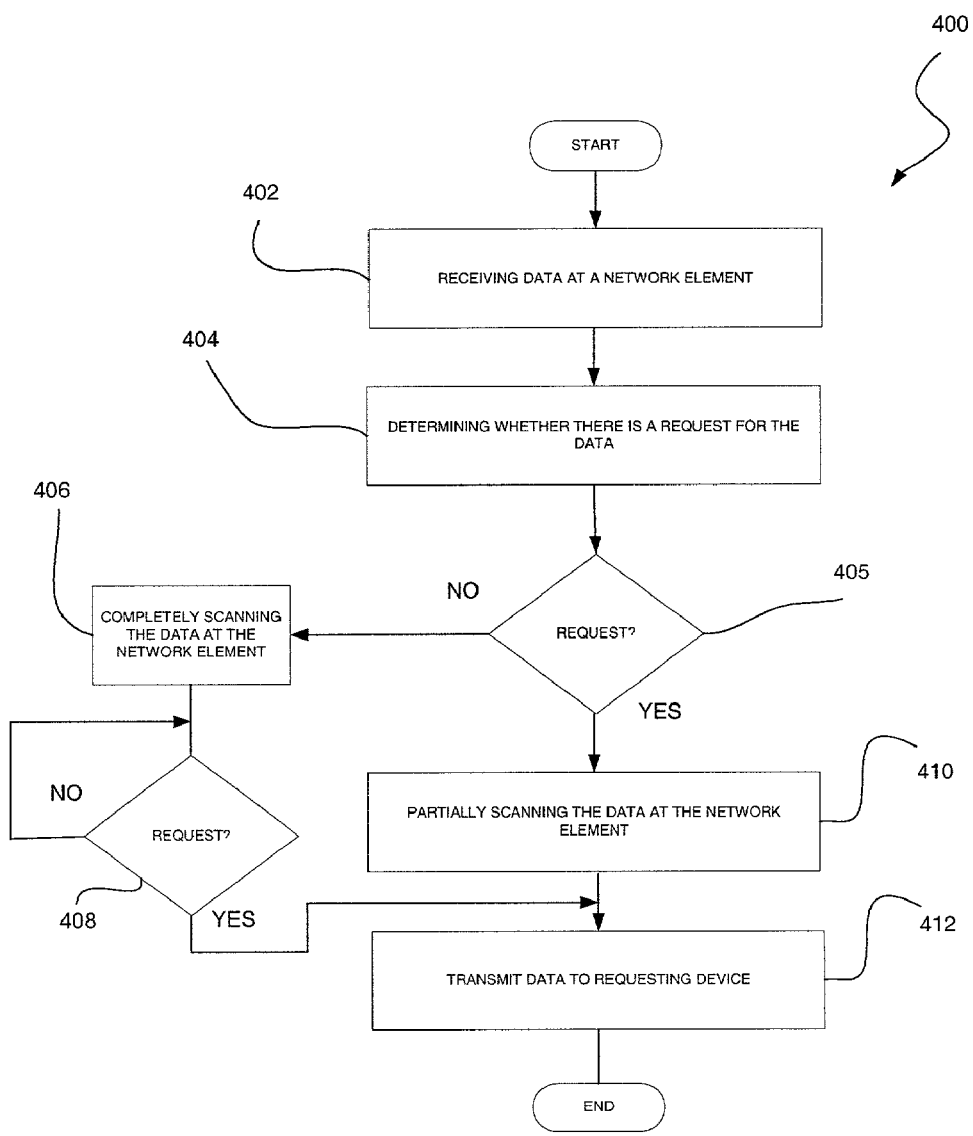
FIG. 4 illustrates another method for scanning data, in accordance with one embodiment.

FIG. 4 illustrates another method 400 for scanning data. In one embodiment, the method 400 may be executed by the data server scanner 120 coupled to each data server 114 of FIG. 1. It should be noted, however, that the method 400 may be executed by any of the scanners 118, 120 and/or 122 of FIG. 1, or by a scanner associated with any desired network element.

Initially, data is received at a network element in operation 402. After the receipt of data at the network element, it is determined as to whether there is a request for the data from another network element in operation 404. As an option, the request for the data may be received from one of the user devices 116.

The data may then be conditionally scanned at the network element based on whether there is a request for the data from another network element. In particular, if it is determined in decision 405 that a request has been made for the data, the data may only be partially scanned at the network element. See operation 410. As an option, an amount of scanning completed at the network element may be a function of a load on the network element. Once partially scanned, the data may be transmitted to the requesting network element in operation 412.

If, on the other hand, it is determined in decision 405 that no request is currently pending for the data, a complete scan may be executed in operation 406. Once the complete scan is executed, the present method 400 may poll until a request is received in decision 408. Once the request received, the data may be transmitted to the requesting network element in operation 412.

It should be noted that the partial and complete scans may each include any type of scan and differ in any desired manner as long as the partial scan takes less time to execute with respect to the complete scan.

Optionally, a status of the scanning at the network element may be stored in memory. As such, an additional network element, i.e. an user device, may conditionally scan the data based on the status in a manner that will be set forth in greater detail during reference to FIG. 6.

Figure 5:
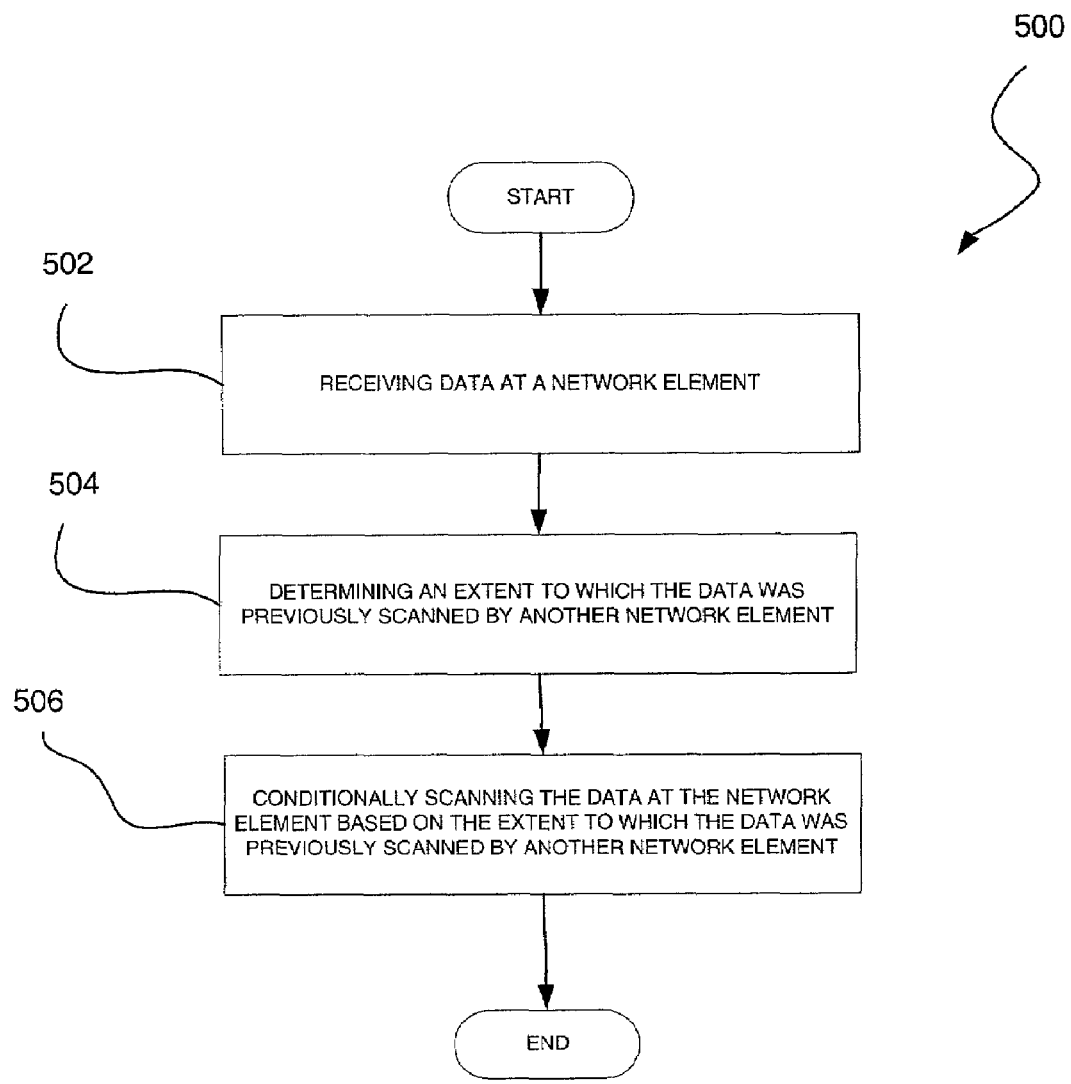
FIG. 5 illustrates yet another method for scanning data, in accordance with one embodiment.

FIG. 5 illustrates yet another method 500 for scanning data, in accordance with one embodiment. As an option, the method 500 may be executed by the user device scanners 122 coupled to the user devices 116 of FIG. 1. It should be noted, however, that the method 500 may be executed by any of the scanners 118, 120 and/or 122 of FIG. 1, or by a scanner associated with any desired network element.

Upon the receipt of data at a network element in operation 502, an extent to which the data was previously scanned by another network element is determined. See operation 504.

The data is then conditionally scanned at the network element based on the extent to which the data was previously scanned by another network element, as indicated in operation 506. In particular, an amount of scanning completed at the network element may be a function of the extent to which the data was previously scanned by another network element.

For example, an amount of scanning completed at the network element may be sufficient to complete an entirety of the scanning. As mentioned earlier, scans often take the form of multiple scanning modules each adapted to detect different types of vulnerabilities, viruses, etc. The current scan of operation 506 may thus include any remaining subset of the full collection of such scanning modules.

Optionally, the extent to which the data was previously scanned by another network element is identified in a memory log accessible by the network element. Further, a status of the scanning at the present network element after operation 506 may be stored in such log. As such, still yet another additional network element may conditionally scan the data based on the status in a manner that will be set forth in greater detail during reference to FIG. 6.

Figure 6:
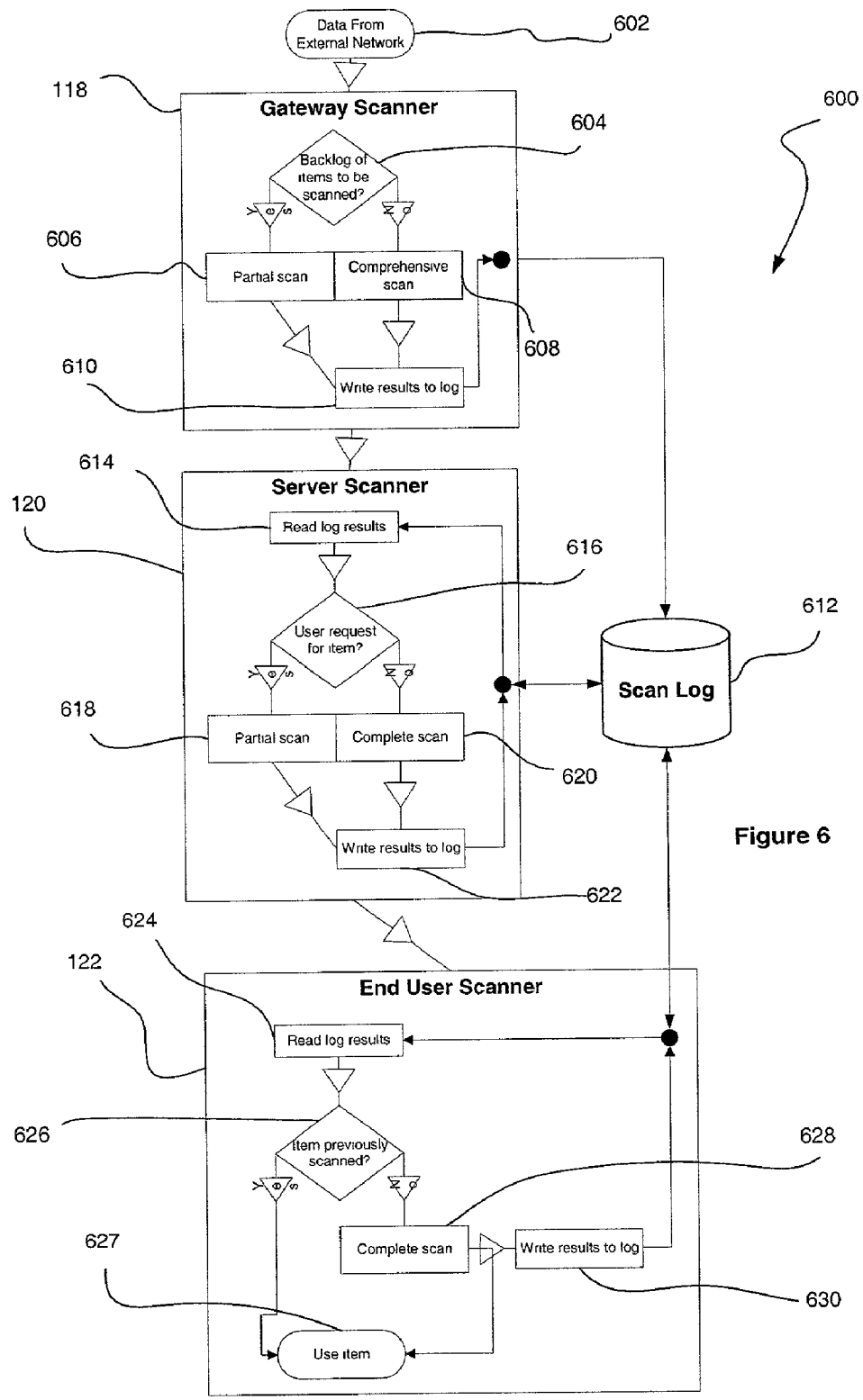
FIG. 6 illustrates an exemplary method combining the various principles set forth hereinabove into a single system.

FIG. 6 illustrates an exemplary method 600 combining the various principles set forth hereinabove into a single system. Initially, in operation 602, data is received from one of the remote networks 102 at the gateway 107 coupled between the remote network 102 and at least one of the data servers 114. It is initially determined in decision 604 whether a backlog of data to be scanned in the gateway scanner 118 exists.

If the backlog is greater than a predetermined amount, a partial scan is performed utilizing the gateway scanner 118 at the gateway 107. See operation 606. If, on the other hand, the backlog is less than the predetermined amount, an entirety of the data is scanned utilizing the gateway scanner 118 at the gateway 107. Note operation 608.

A first status as to the scanning performed utilizing the gateway scanner 118 is stored in a database 612 coupled to the gateway scanner 118. Note operation 610. Such database 612 may be coupled to the gateway scanner 118 via one of the networks 102 and 108, reside at the gateway 107, or in any desired location. More information regarding such process may be found by reference to FIG. 3.

Next, the data is passed from the gateway scanner 118 to the data server 114 coupled thereto. At the data server scanner 120 of the data server 114, the first status stored in operation 610 is read from the database 612 utilizing the data server scanner 120 at the data server 114. Note operation 614.

It is then determined in decision 616 whether there is a request for the data from at least one user device 116 coupled to the data server 114. If it is determined that there is a request for the data from the user device 116, a partial scan is executed. Note operation 618. It should be noted that the scanning may be ceased before a complete scan can be executed if the request is received during the scan. If, however, it is determined that there is not a request for the data from the user device 116, a complete scan is executed. See operation 620.

A second status of the scanning performed utilizing the data server scanner 120 is then stored in the database 612 which is coupled thereto. Note operation 622. It should be noted that the second status may be simply an update to the first status, a stand-alone status record, or any desired information for tracking the current status of the scanning. In use, the data is transmitted to the user device 116 in response to the request. More information regarding such process may be found by reference to FIG. 4.

At the user device 116, the second status is read from the database 612 utilizing the user device scanner 122 at the user device 116. See operation 624. As such, it may be determined whether the scanning of the data is complete based on the first status and the second status. If it is determined that the scanning of the data is complete in decision 626, the data is simply used at the user device 116. See operation 627. If it is determined that the scanning of the data is not complete in decision 626, the scanning of the data is completed utilizing the user device scanner 122 at the user device 116. Note operation 628.

Finally, in operation 630, a third status is stored in the database 612 for indicating that the scanning is complete. As such, other network elements may selectively scan the data based on the status. More information regarding such process may be found by reference to FIG. 5.

It should be noted that processes similar to those set forth hereinabove may be used with outgoing data. For example, the user device scanners 122 of the user devices 116 may utilize the functionality of FIGS. 3 and 4 in response to load conditions and requests made by other network elements, respectively. Moreover, the gateway scanner 118 of the gateway 107 may employ the techniques of FIG. 5 prior to transmitting data to the remote networks 102. Of course, any of the network elements may employ any of the desired functionality set forth hereinabove.

The various techniques disclosed herein thus provide the ability to intelligently vary the amount of scanning based upon available computing resources and content bandwidth requirements, to identify data that has been partially checked and identify the data integrity status with other applications through the use of the database, and to defer lower priority scanning tasks to another time, and or delegate scanning tasks to other available networked scanning computers if adequately prioritized analysis resources are not available.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A scanning method, comprising:
 a) receiving data at a network element;
 b) identifying a load on the network element; and
 c) conditionally scanning the data at the network element based on the load on the network element;
 wherein an amount of scanning completed at the network element is a function of the load on the network element;
 wherein the data is partially scanned at the network element if the load on the network element is greater than a predetermined amount.

2. The method as recited in claim 1, wherein the network element includes a gateway.

3. The method as recited in claim 1, wherein the load includes a backlog of data to be scanned at the network element.

4. The method as recited in claim 1, wherein the data is completely scanned at the network element if the load on the network element is less than the predetermined amount.

5. The method as recited in claim 1, and further comprising storing a status of the scanning at the network element.

6. The method as recited in claim 5, wherein an additional network element conditionally scans the data based on the status.

7. The method as recited in claim 6, wherein the additional network element includes a server.

8. A computer program product embodied on a computer readable medium for scanning, comprising:
 a) computer code for receiving data at a network element;
 b) computer code for identifying a current load on the network element; and
 c) computer code for conditionally scanning the data at the network element based on the load on the network element;
 wherein an amount of scanning completed at the network element is a function of the load on the network element;
 wherein the data is partially scanned at the network element if the load on the network element is greater than a predetermined amount.

9. A scanning system, comprising:
 a) means for receiving data at a network element;
 b) means for identifying a current load on the network element; and
 c) means for conditionally scanning the data at the network element based on the load on the network element;
 wherein an amount of scanning completed at the network element is a function of the load on the network element;
 wherein the data is partially scanned at the network element if the load on the network element is greater than a predetermined amount.

10. A scanning method, comprising:
 a) receiving data at a network element;
 b) determining whether there is a request for the data and identifying a load on the network element;
 c) conditionally scanning the data at the network element based on whether there is a request for the data and the load on the network element; and
 d) transmitting the data in response to the request;
 wherein an amount of scanning completed at the network element is a function of whether there is a request for the data and the load on the network element;
 wherein the data is partially scanned at the network element if the load on the network element is greater than a predetermined amount.

11. The method as recited in claim 10, wherein the network element includes a server.

12. The method as recited in claim 10, wherein the request for the data is received from a user device.

13. The method as recited in claim 10, wherein the data is partially scanned at the network element if it is determined that there is a request for the data.

14. The method as recited in claim 13, wherein the data is completely scanned at the network element if it is determined that there is not a request for the data.

15. The method as recited in claim 10, and further comprising storing a status of the scanning at the network element.

16. The method as recited in claim 15, wherein an additional network element conditionally scans the data based on the status.

17. A computer program product embodied on a computer readable medium for scanning, comprising:

a) computer code for receiving data at a network element;
b) computer code for determining whether there is a request for the data;
c) computer code for conditionally scanning the data at the network element based on whether there is a request for the data and a load on the network element; and
d) computer code for transmitting the data in response to the request;
wherein an amount of scanning completed at the network element is a function of whether there is a request for the data and the load on the network element;
wherein the data is partially scanned at the network element if the load on the network element is greater than a predetermined amount.

18. A scanning system, comprising:
a) means for receiving data at a network element;
b) means for determining whether there is a request for the data;
c) means for conditionally scanning the data at the network element based on whether there is a request for the data and a load on the network element; and
d) means for transmitting the data in response to the request;
wherein an amount of scanning completed at the network element is a function of whether there is a request for the data and the load on the network element;
wherein the data is partially scanned at the network element if the load on the network element is greater than a predetermined amount.

19. A scanning method, comprising:
a) receiving data at a network element;
b) determining an extent to which the data was previously scanned by another network element and identifying a load on the network element;
c) conditionally scanning the data at the network element based on the extent to which the data was previously scanned by another network element and the load on the network element;
wherein an amount of scanning completed at the network element is a function of the extent to which the data was previously scanned by another network element and the load on the network element;
wherein the data is partially scanned at the network element if the load on the network element is greater than a predetermined amount.

20. The method as recited in claim 19, wherein the network element includes a user device.

21. The method as recited in claim 19, wherein an amount of scanning completed at the network element is a function of the extent to which the data was previously scanned by another network element.

22. The method as recited in claim 21, wherein an amount of scanning completed at the network element is sufficient to complete an entirety of the scanning.

23. The method as recited in claim 21, wherein the extent to which the data was previously scanned by another network element is identified in a log accessible by the network element.

24. The method as recited in claim 19, and further comprising storing a status of the scanning at the network element.

25. The method as recited in claim 24, wherein an additional network element conditionally scans the data based on the status.

26. A computer program product embodied on a computer readable medium for scanning, comprising:
a) computer code for receiving data at a network element;
b) computer code for determining an extent to which the data was previously scanned by another network element;
c) computer code for conditionally scanning the data at the network element based on the extent to which the data was previously scanned by another network element and a load on the network element;
wherein an amount of scanning completed at the network element is a function of the extent to which the data was previously scanned by another network element and the load on the network element;
wherein the data is partially scanned at the network element if the load on the network element is greater than a predetermined amount.

27. A scanning system, comprising:
a) means for receiving data at a network element;
b) means for determining an extent to which the data was previously scanned by another network element;
c) means for conditionally scanning the data at the network element based on the extent to which the data was previously scanned by another network element and a load on the network element;
wherein an amount of scanning completed at the network element is a function of the extent to which the data was previously scanned by another network element and the load on the network element;
wherein the data is partially scanned at the network element if the load on the network element is greater than a predetermined amount.

28. A method for efficient scanning, comprising:
a) receiving data from a network at a gateway coupled between a network and at least one data server;
b) identifying a backlog of data to be scanned in the gateway;
c) if the backlog is greater than a predetermined amount, performing a partial scan utilizing a gateway scanner at the gateway;
d) if the backlog is less than the predetermined amount, performing a complete scan utilizing the gateway scanner at the gateway;
e) storing a first status of the scanning performed utilizing the gateway scanner in a database coupled to the gateway scanner;
f) passing the data from the gateway scanner to the data server coupled thereto;
g) reading the first status from the database utilizing a data server scanner at the data server;
h) determining whether there is a request for the data from at least one user device coupled to the data server;
i) if it is determined that there is a request for the data from the user device, performing a partial scan on the data;
j) storing a second status of the scanning performed utilizing the data server scanner in the database which is coupled thereto;
k) transmitting the data to the user device;
l) reading the second status from the database utilizing a user device scanner at the user device;

m) determining whether the scanning of the data is complete based on the first status and the second status; and n) if it is determined that the scanning of the data is not complete, completing the scanning of the data utilizing the user device scanner at the user device.

29. The method as recited in claim 28, and farther comprising storing a third status of the scanning performed utilizing the user device scanner in the database which is coupled thereto.

* * * * *